United States Patent [19]
Hayashi

[11] Patent Number: 4,497,547
[45] Date of Patent: Feb. 5, 1985

[54] ZOOM LENS
[75] Inventor: Kiyoshi Hayashi, Yokohama, Japan
[73] Assignee: Nippon Kogaku K.K., Tokyo, Japan
[21] Appl. No.: 367,807
[22] Filed: Apr. 13, 1982
[30] Foreign Application Priority Data
Apr. 24, 1981 [JP] Japan ................................ 56/61469
[51] Int. Cl.³ .......*................ G02B 9/64; G02B 15/18
[52] U.S. Cl. .................................................... 350/427
[58] Field of Search ....................................... 350/427
[56] References Cited
U.S. PATENT DOCUMENTS
4,303,312 5/1981 Basista ............................... 350/427
FOREIGN PATENT DOCUMENTS
0056947 5/1977 Japan ................... 350/427

Primary Examiner—John K. Corbin
Assistant Examiner—Rebecca D. Gass
Attorney, Agent, or Firm—Shapiro and Shapiro

[57] ABSTRACT

A zoom lens comprises, in succession from the object side, a convergent first lens unit stationary during zooming and moved on the optical axis during focusing, a divergent second lens unit which is a variator moved on the optical axis during zooming, a divergent third lens unit which is a compensator moved on the optical axis during zooming, and a convergent fourth lens unit as a master lens system stationary during zooming. The fourth lens unit comprises, in succession from the object side, a convergent first master lens unit, a convergent second master lens unit and a divergent third master lens unit. The first master lens unit has, in succession from the object side, a positive lens, a positive and a negative lens cemented to each other in a cemented surface concave toward the object side, a positive lens having its surface of greater curvature facing the object side, and a negative lens having its surface of greater curvature facing the image side. The second master lens unit has a biconvex single lens, and the third master lens unit has at least one negative lens and a positive lens.

6 Claims, 11 Drawing Figures

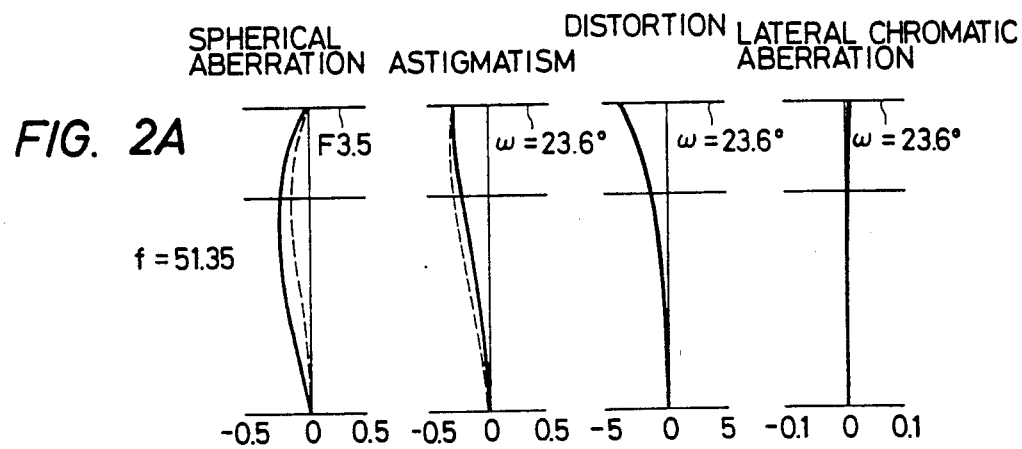
FIG. 2A  f = 51.35
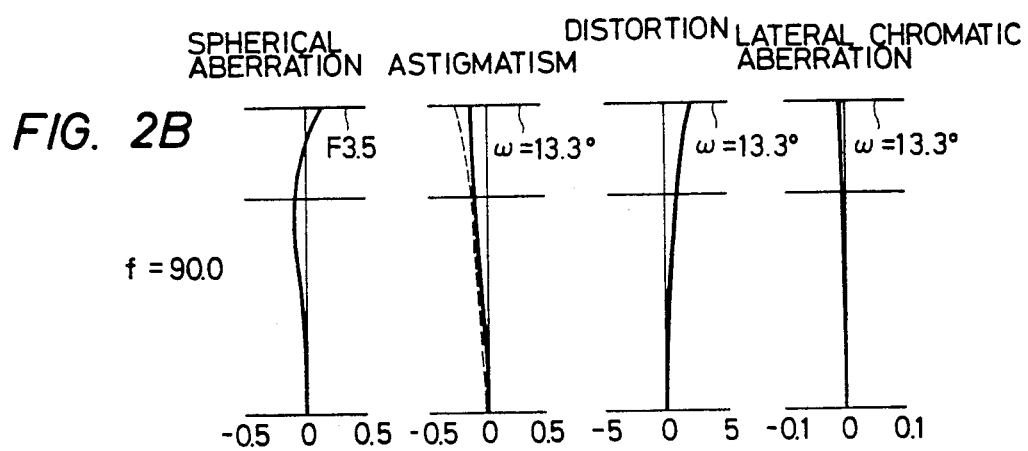
FIG. 2B  f = 90.0
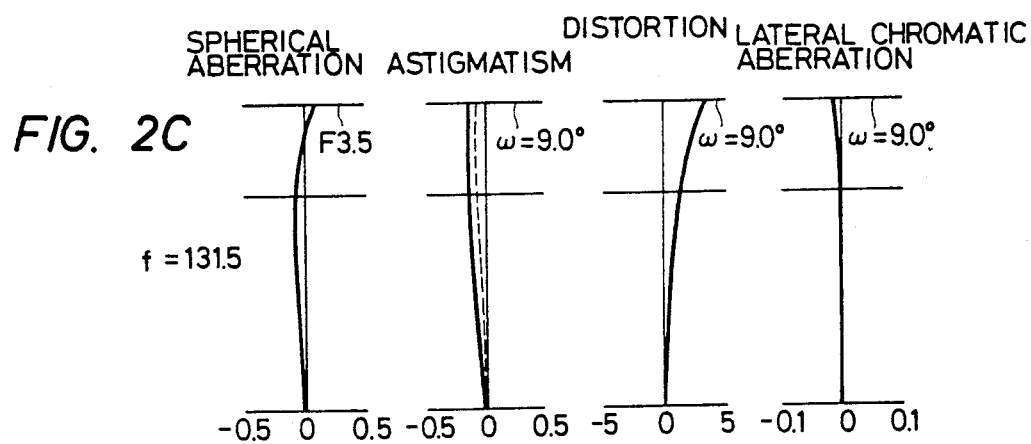
FIG. 2C  f = 131.5

4,497,547

ZOOM LENS

BACKGROUND OF THE INVENTION

1. Field of the Invention

This invention relates to a photographic zoom lens, and more particularly to a zoom lens suitable to cover the range from standard to medium telephoto.

2. Description of the Prior Art

In recent years, zoom lenses for 35 mm still camera have been becoming more and more compact. In a zoom lens comprising a magnification changing system consisting of three lens units and a master lens system, an attempt to make the lens system compact is divided into two elements, that is, making the magnification changing system compact and making the master lens system compact. Where an attempt is made to make the magnification changing system compact, the power of each unit of the magnification changing system must be made strong and particularly, in order to reduce the amount of movement of the magnification changing lens unit, the negative power of the second unit which contributes chiefly to magnification change becomes strong and therefore, Petzval sum becomes greatly negative and curvature of image field is so much aggravated that it is difficult to correct it. Also, high-order spherical aberration (particularly at the telephoto end) is created or the symmetry of coma is destroyed or the fluctuation of lateral chromatic aberration by the angle of view is produced and thus, correction of aberrations becomes very difficult. Moreover, the fluctuation of these aberrations by zooming become great and this is not preferable. Thus, compaction of the magnification changing system is naturally limited. On the other hand, considering the compaction of the master system, the full length can be reduced by constructing the master system by two positive and negative units and making it into a teletype, but the necessity of allotting a strong negative power to the rearward unit arises and Petzval sum is greatly increased in the negative sense and therefore, this is also naturally limited. In a zoom lens having a magnification changing system comprising three positive, negative and negative units, the light beam after having left the negative third lens unit is a strong divergent light beam and moreover, where the angle of view of the standard lens is covered by the 35 mm format, if the telephoto ratio of the master lens system is reduced, spherical aberration, particularly high-order spherical aberration, astigmatism, curvature of image field, etc. are sharply increased and correction of aberrations becomes very difficult. If the master lens is made into a construction approximate to the symmetric type such as a Gauss type lens in order to correct this spherical aberration, the oblique light beam is greatly diverged particularly by the strong diverging action of the negative lens of the forward unit in the master lens system in a lens wherein a diaphragm is disposed forwardly of the master lens system and therefore, the diameter of the lens of the rearward unit in the master lens system is increased, and this has greatly hampered compaction of the lens system.

SUMMARY OF THE INVENTION

It is an object of the present invention to overcome the above-noted disadvantages resulting from compaction and to provide a zoom lens which is compact and high in performance and yet has a focal length range from standard to quasi-telephoto.

The invention will become fully apparent from the following detailed description thereof taken in conjunction with the accompanying drawings.

BRIEF DESCRIPTION OF THE DRAWINGS

FIGS. 2A, 2B, 2C, 4A, 4B, 4C and 5A, 5B, 5C illustrate the various aberrations in the first, second and third embodiments, respectively.

DESCRIPTION OF THE PREFERRED EMBODIMENTS

Figure 1:
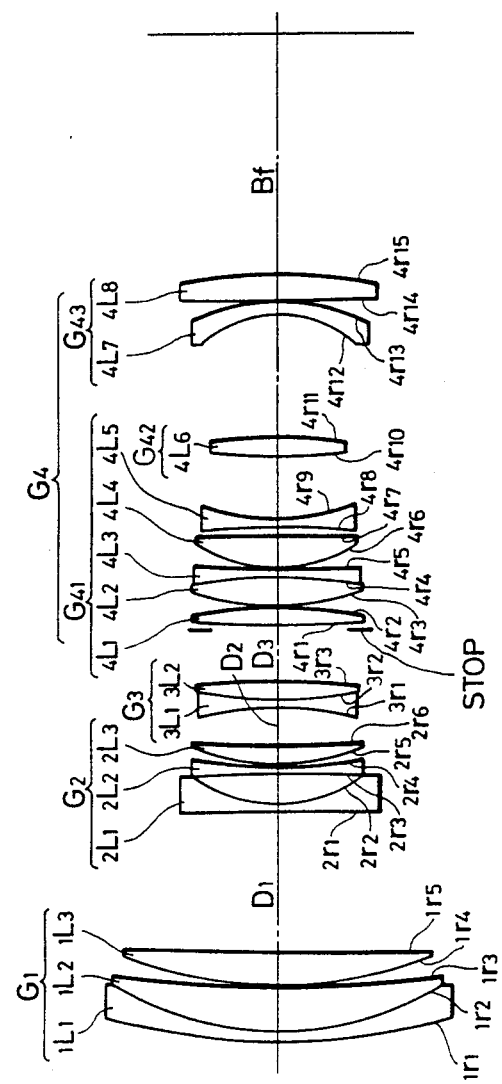
FIG. 1 shows the lens construction according to a first embodiment of the present invention.

In the present invention, a master lens system is comprised of three units, i.e., positive, positive and negative units. Specifically, as shown in FIG. 1 which shows a first embodiment, in a zoom lens comprising, in succession from the object side, four units, i.e., a convergent first lens group $G_1$ stationary during zooming and moved on the optical axis during focusing, a divergent second lens unit $G_2$ which is a variator moved on the optical axis during zooming, a divergent third lens unit $G_3$ which is a compensator moved on the optical axis during zooming, and a convergent fourth lens unit $G_4$ as a master lens system stationary during zooming, the fourth lens unit $G_4$ comprises, in succession from the object side, three units, i.e., a convergent first master lens unit $G_{41}$, a convergent second master lens unit $G_{42}$ spaced from the first master lens unit $G_{41}$ with an air space, and a divergent third master lens unit $G_{43}$ spaced from the second master lens unit $G_{42}$ with an air space, the first master lens unit $G_{41}$ comprises, in succession from the object side, a biconvex lens $_4L_1$, a positive lens $_4L_2$ and a negative lens $_4L_3$ cemented together by a concave cemented surface on the object side, a positive lens $_4L_4$ having its surface of greater curvature facing the object side, and a negative lens $_4L_5$ having its surface of greater curvature facing the image side, the second master lens unit $G_{42}$ comprises a biconvex positive lens $_4L_6$, and the third master lens unit $G_{43}$ comprises a negative lens $_4L_7$ and a positive lens $_4L_8$, and the zoom lens satisfies the following conditions:

$$1.70 < |f_{42}/f(_4r_9)| < 4.20 \tag{1}$$

$$0.05 f_{42} < {}_4d_9 < 0.13 f_{42} \tag{2}$$

$$-0.2 < (_4r_{11} + {}_4r_{10})/(_4r_{11} - {}_4r_{10}) < 0.1 \tag{3}$$

$$0.75 < f(_4r_9)/f(_4r_{12}) < 1.15 \tag{4}$$

$$0.65 f(_4r_{12}) < {}_4d_9 + n(_4L_6) \cdot {}_4d_{10} + {}_4d_{11} < 0.85 f(_4r_{12}) \tag{5}$$

$$n(_4L_3) - n(_4L_2) \geq 0.18 \tag{6}$$

$$0.8 < |f(_4L_4)/f(_4L_5)| < 1.35 \tag{7}$$

$$n(_4L_5) - n(_4L_4) \geq 0.23 \tag{8}$$

where
$_ir_j$: radius of curvature of the jth surface from the object side in the ith lens unit
$_id_j$: the jth space from the object side in the ith lens unit $n(_iL_j)$: refractive index of the jth lens in the ith lens in the ith lens unit of d-line ($\lambda = 587.6$ nm)

$f_{42}$: focal length of the second master lens unit $G_{42}$ $f(_ir_j)$: focal length of the jth surface in the ith lens unit $f(_iL_j)$: focal length of the jth lens in the ith lens unit Each of the above conditions will hereinafter be described.

Conditions (1) and (2) are for chiefly preventing any increase in diameter of the rearward lens for the purpose of making the master lens system compact. The oblique light beam passed through the diaphragm is sharply diverged by the negative lens included in the first master lens unit $G_{41}$. This diverged light beam is converged by the positive lens in the second master lens unit $G_{42}$, whereby the distance from the optical axis of the light beam incident on the third master lens unit $G_{43}$ can be made small and thus, any increase in diameter of the rearward lens can be prevented and the lens system can be made slender. Accordingly, the relative relation between the surface having a negative power of the first master lens unit $G_{41}$ having the function of sharply diverging the oblique light beam, namely, the surface $_4r_9$ in the present invention, and the positive power of the second master lens unit $G_{42}$ is a very important factor in making the lens system compact. Condition (1) prescribes the relative relation between the focal length $f(_4r_9)$ of the surface $_4r_9$ and the focal length $f_{42}$ of the second master lens unit $G_{42}$. If the upper limit of condition (1) is exceeded, $f_{42}$ for $f(_4r_9)$ will become great and a remarkable effect can no longer be expected regarding the reduction in diameter of the rearward lens. If the lower limit of condition (1) is exceeded, $f_{42}$ will become small for $f(_4r_9)$ and this is convenient for making the diameter of the rearward lens small, but the positive power of the second master lens unit $G_{42}$ will become strong and therefore, spherical aberration will be increased in the negative sense and this is not preferable. Also, under condition (1), the relative position of the first master lens unit $G_{41}$ and the second master lens unit $G_{42}$ has an important meaning regarding the reduction in diameter of the rearward lens. When the problems in aberrations are taken into account, it is most suitable to set the spacing $_4d_9$ between the first master lens unit $G_{41}$ and the second master lens unit $G_{42}$ in the present invention to the range of condition (2). If the upper limit of condition (2) is exceeded, it will become disadvantageous regarding the reduction in diameter of the rearward lens and in addition, curvature of image field will be sharply increased in the positive sense and astigmatism will become great, and an asymmetric component of coma will be produced and spherical aberration will also be increased in the positive sense. If the lower limit of condition (2) is exceeded, it will be advantageous for the reduction in diameter of the rearward lens but curvature of image field will be increased in the negative sense and astigmatism will be produced and again an asymmetric component of coma will become salient and spherical aberration will be sharply increased in the negative sense.

Condition (3) prescribes the shape of the positive lens in the second master lens unit $G_{42}$. By this condition being satisfied, the aberration structure of the lenses in the second master lens unit becomes optimum. If the upper limit of condition (3) is exceeded, spherical aberration will be increased in the positive sense and high-order aberrations will be produced. In addition, negative curvature of image field will be produced to an unallowable degree. If the lower limit of condition (3) is exceeded, spherical aberration will be increased in the negative sense and curvature of image field will be increased to an unallowable degree.

Conditions (4) and (5) are concerned with correction of astigmatism and curvature of image field. In a zoom lens having a master lens like that of the present invention, as regards astigmatism and curvature of image field, the relative position of the structure of the third master lens unit $G_{43}$ and the first master lens unit $G_{41}$ is a very important factor. Condition (4) is for correcting astigmatism and curvature of image field while keeping spherical aberration good. If the upper limit of condition (4) is exceeded, $f(_4r_{12})$ will become small for $f(_4r_9)$ and curvature of image field will be increased in the positive sense and astigmatism will be created. Also, an asymmetric component of coma will appear. If the lower limit of condition (4) is exceeded, curvature of image field will be increased in the negative sense and again astigmatism and an asymmetric component of coma will be produced to an unallowable degree. Condition (5) is concerned with the relative position of the third master lens unit $G_{43}$ to the first master lens unit $G_{41}$. In order that negative curvature of image field produced by the magnification changing system may be corrected by the master lens system, the third master lens group $G_{43}$ may be as much spaced as possible from the first master lens group $G_{41}$, but if the former is too much spaced from the latter, the full length of the master lens system itself will also become great and the necessary back focal length cannot be secured. If the upper limit of condition (5) is exceeded, it will be advantageous for drawing curvature of image field in the positive sense but it will become difficult to secure the necessary back focal length. If the lower limit of condition (5) is exceeded, negative curvature of image field will become difficult to correct.

Condition (6) supplements conditions (1), (2), (4) and (5) and is an auxiliary condition concerned with the prevention of any increase in diameter of the rearward lens and the correction of negative curvature of image field. It has already been described that $f(_4r_9)$ greatly contributes to an increase in diameter of the rearward lens, but by allotting the power of $f(_4r_9)$ to the cemented surface $_4r_4$ of $_4L_2$ and $_4L_3$, the power of $_4r_9$ can be weakened. Accordingly, by setting the range of condition (6) regarding the refractive indices of the glasses of $_4L_2$ and $_4L_3$, not only the achromatizing function but also a negative power can be provided to the cemented surface, whereby the power of $_4r_9$ can be slowed down to contribute to an increase in diameter of the rearward lens and the function of drawing in the positive sense the curvature of image field concerning the standard wavelength can also be allotted. If the lower limit of condition (6) is exceeded, the effect for the other function than this achromatization will becomes less, and the upper limit of condition (6) is naturally determined by the type of the existing glass material. Moreover, this range is useful for rendering Petzval sum positive and is also effective for the correction of curvature of image field.

Conditions (7) and (8) are for correcting high-order spherical aberration. By opposing $_4L_4$ and $_4L_5$ in the first master lens unit $G_{41}$ to each other with a slight air space interposed therebetween and by conditions (7) and (8) being satisfied, high-order spherical aberration can be negated to make good correction possible. If the upper limit of condition (7) is exceeded, the power of $_4L_5$ as opposed to $_4L_4$ will become strong and therefore, spherical aberration will be remarkably over-corrected and high-order bending of spherical aberration curve will be created. If the lower limit of condition (7) is exceeded, the positive power of $_4L_4$ as opposed to $_4L_5$ will become strong and therefore, spherical aberration will be remarkably under-corrected and again high-order bending will be created. To enhance the effect of negation the high-order aberrations by the positive and negative lenses, it is necessary to provide a difference in refractive index between $_4L_4$ and $_4L_5$ and the actions of the surfaces $_4r_7$ and $_4r_8$ opposed to each other with an air space interposed therebetween are enhanced. If the lower limit of condition (8) is exceeded, the effect of negation for high-order spherical aberration will become less. The upper limit of condition (8) is naturally determined by the existing glass material. The range of this condition (8) is a desirable direction for the correction of Petzval sum as well, and this condition (8) is similar to condition (6) in that it plays a great role also for the correction of curvature of image field.

As described above, conditions (1)–(8) are important conditions concerning the master lens system, and satisfying these conditions is requite for providing a compact zoom lens of high performance.

In the present invention, it is desirable that the following conditions be further satisfied regarding the master lens system:

$$0.80 < (_4r_7 + _4r_6)/(_4r_7 - _4r_6) < 1.10 \tag{9}$$

$$-0.90 < (_4r_9 + _4r_8)/(_4r_7 - _4r_6) < 1.10 \tag{10}$$

$$2.5 < (_4r_{13} + _4r_{12})/(_4r_{13} - _4r_{12}) < 5.5 \tag{11}$$

$$n(_4L_1) \geq 1.65, \; \nu(_4L_1) \geq 44 \tag{12}$$

$$70 \geq (\nu(_4L_2) - \nu(_4L_3)) + (\nu(_4L_4) - \geq(_4L_5)) \geq 40 \tag{13}$$

$$|\nu(_4L_8) - \nu(_4L_7)| \leq 10 \tag{14}$$

where $\nu(_iL_j)$ represent the Abbe number of the jth lens from the object side in the ith lens unit.

Conditions (9) and (10) are concerned with spherical aberration and curvature of image field. As regards the shape of $_4L_4$, a shape in which spherical aberration is substantially approximate to minimum is desirable, and a range realized in the range of condition (9) is optimum. If the upper limit of condition (9) is exceeded, curvature of image field will be increased in the negative sense and, if the lower limit of condition (9) is exceeded, curvature of image field will be increased in the positive sense and an asymmetric component of coma and astigmatism will be created. If the upper limit of condition (10) is exceeded, spherical aberration will be increased in the positive sense and curvature of image field will be increased in the negative sense and, if the lower limit of condition (10) is exceeded, spherical aberration will be increased in the negative sense and curvature of image field will be increased in the positive sense, and all this is not preferable. Condition (11) is concerned particularly with curvature of image field, astigmatism and symmetry of coma, and prescribes the shape of the negative lens in the third master lens unit $G_{43}$. If the upper limit of condition (11) is exceeded, curvature of image field will be increased in the positive sense and, if the lower limit of condition (11) is exceeded, curvature of image field will be increased in the negative sense and astigmatism and an asymmetric component of coma will be created. Condition (12) is concerned with the refractive index and the Abbe number of the first positive lens $_4L_1$ in the first master lens unit $G_{41}$. This condition is particularly for preventing spherical aberration and the variation therein by chromatic aberration. If the range of refractive index of condition (12) regarding d-line is exceeded, the radius of curvature of the lens must be made sharper to secure the same power and high-order spherical aberration will be created. Also, if Abbe number goes toward the direction of high dispersion beyond the range of the inequality regarding Abbe number, a variation in spherical aberration by color will be created and this is not preferable. Conditions (13) and (14) are concerned with the correction of chromatic aberration, and condition (13) determines the structure of chromatic aberration in the first master lens unit $G_{41}$ and condition (14) determines the structure of chromatic aberration in the third master lens unit $G_{43}$. In the first master lens unit $G_{41}$, chiefly the on-axis chromatic aberration is corrected and, in the third master lens unit $G_{43}$, chiefly the lateral chromatic aberration is corrected. Outside the range of condition (13), correction of the on-axis chromatic aberration becomes difficult and for the achromatized condition of the first master lens unit $G_{41}$ within the range prescribed by condition (13), the range of achromatization of the third master lens unit prescribed by condition (14) is most suitable.

Finally, desirable conditions concerning each unit of the magnification changing system will be described. In these conditions $f_1$ is the focal length of the entire first unit $G_1$.

$$1.10 < f(_1L_3)/f_1 - 1.45 \tag{15}$$

$$1.65 \leq n(_1L_3) \leq 1.78 \tag{16}$$

$$45 \leq \nu(_1L_3) \leq 65 \tag{17}$$

$$-1.0 < (_2r_2 + _2r_1)/(_2r_2 - _2r_1) < -0.85 \tag{18}$$

$$1.0 < (_2r_6 + _2r_5)/(_2r_6 - _2r_5) < 2.0 \tag{19}$$

$$n(_2L_1) \geq 1.65 \tag{20}$$

$$n(_2L_3) \geq 1.70 \tag{21}$$

$$1.75 < (_3r_b + _3r_a)/(_3r_b - _3r_a) < 2.3 \tag{22}$$

Conditions (15)–(17) relate to the lens $_1L_3$ in the first unit and are concerned chiefly with correction of spherical aberration. Condition (15) prescribes the most appropriate range of power to be assumed by the lens $_1L_3$ in the first unit, and if the upper limit of this condition is exceeded, $f(_1L_3)$ will become small for $f_1$ and the lens $_1L_3$ will refract light rays with a strong power. Therefore, spherical aberration will be sharply increased in the negative sense particularly at the telephoto end and in addition, positive distortion will also be created at the telephoto end. If the lower limit of condition (15) is exceeded, the power of $_1L_3$ will become weak and the corresponding power will be allotted to $_1L_1$ and $_1L_2$, and this is not preferable for correction of chromatic aberration. In addition, it leads to an increase in diameter of the forward lens. It is desirable that conditions (16) and (17) be further satisfied under condition (15). If the lower limit of condition (16) is exceeded, the radius of curvature will have to be made sharper to obtain the same power and this will also lead to creation of high-order aberrations. If the upper limit of condition (16) is exceeded, dispersion of the glass material will become high and the differences by colors of chromatic aberration, especially, spherical aberration astigmatism and coma, will be created and this is not preferable. Condition (17) is the range necessary to suppress the creation of chromatic aberration, and if the lower limit of this condition is exceeded, the glass material of low refractive index will only exist and the glass material of the range shown by condition (16) cannot be obtained.

Conditions (18)–(22) determine the aberration structure of the second unit. Conditions (18) and (19) are concerned with the fluctuations of spherical aberration and curvature of image field by zooming. If the upper limit of condition (18) is exceeded, spherical aberration will be greatly created in the negative sense particularly at the telephoto end and curvature of image field will be increased in the positive sense. If the lower limit of condition (18) is exceeded, spherical aberration will again be greatly increased in the positive sense particularly at the telephoto end and curvature of image field will be increased in the positive sense at the wide angle end and in the negative sense at the telephoto end and thus, a fluctuation by zooming will be created. If the upper limit of condition (19) is exceeded, both spherical aberration and curvature of image field will be increased in the negative sense and in addition, an asymmetric component of coma will be created to an unallowable degree. If the lower limit of condition (19) is exceeded, spherical aberration will be increased in the positive sense particularly at the telephoto end and curvature of image field will be increased in the positive sense at the wide angle end and in the negative sense at the telephoto end and thus, a fluctuation by zooming will be created. In addition, an asymmetric component of coma will be created and this is not preferable. Condition (20) is concerned with curvature of image field and, outside the range of this condition, the radii of curvature of the lenses must be sharper to obtain the same power. Particularly, the curvature of that surface of $_2L_1$ which is adjacent to the image side becomes sharp, whereby high-order aberrations are created and the bending of curvature of image field by the angle of view is created, and this is not very preferable. Also, the range of this condition is advantageous also for correction of Petzval sum. Condition (21) is concerned with high-order spherical aberration and is desirable to slow down the radius of curvature of the lens $_2L_3$ and prevent creation of high-order spherical aberration. Condition (22) is concerned with the third unit and it ensures the symmetry of coma. Outside the range of condition (22), an asymmetric component of coma is created and, if the upper limit of this condition is exceeded, inward coma will become salient, and if the lower limit of this condition is exceeded, outward coma will become salient, and this tendency is remarkable particularly at the telephoto end.

In a first embodiment of the present invention, as shown in the lens construction of FIG. 1, the first lens unit $G_1$ comprises, in succession from the object side, a negative meniscus lens $_1L_1$ having its convex surface facing the object side, as positive meniscus lens $_1L_2$ cemented to the lens $_1L_1$ and having its convex surface facing the object side, and a positive meniscus lens $_1L_3$ having its convex surface facing the object side, the second lens unit $G_2$ comprises, in succession from the object side, a negative lens $_2L_1$ having its surface of sharper curvature facing the image side, a biconcave negative lens $_2L_2$, and a positive lens $_2L_3$ having its surface of sharper curvature facing the object side, and the third lens unit $G_3$ comprises a biconcave negative lens $_3L_1$ and a biconvex positive lens $_3L_2$ cemented thereto, and as a whole, it has a negative meniscus shape having its convex surface facing the image side. The fourth lens unit $G_4$ as the master lens system comprises three units, i.e., a first master lens unit $G_{41}$, a second master lens unit $G_{42}$ and a third master lens group $G_{43}$, and the construction of each group of the master lens system is such as previously described. The zoom lens of the present embodiment is one for 35 mm still camera and has a focal length of 50 mm–135 mm, covers the range from standard to medium telephoto and has an F-number 3.5.

The numerical data of the first embodiment will be shown below. In the table below $D_i$ represents the air space between the ith lens unit and the subsequent lens unit, and Bf represents the back focal length. (This also holds true of the following embodiments.)

FIRST EMBODIMENT

Focal length f = 51.35 ~ 131.5  F-number 3.5
Angle of view 2W = 47.26° ~ 18.06°

| | | | | | | | | | |
|---|---|---|---|---|---|---|---|---|---|
| $_1r_1 =$ | 95.858 | $_1d_1 =$ | 1.7000 | $_1\nu_1 =$ | 25.4 | $_1n_1 =$ | 1.80518 | $_1L_1$ | |
| $_1r_2 =$ | 49.020 | $_1d_2 =$ | 8.000 | $_1\nu_2 =$ | 55.6 | $_1n_2 =$ | 1.67790 | $_1L_2$ | $G_1$ |
| $_1r_3 =$ | 214.552 | $_1d_3 =$ | 0.1000 | | | | | | |
| $_1r_4 =$ | 75.769 | $_1d_4 =$ | 5.0000 | $_1\nu_3 =$ | 48.4 | $_1n_3 =$ | 1.66672 | $_1L_3$ | |
| $_1r_5 =$ | 691.304 | $D_1 =$ | Variable | | | | | | |
| $_2r_1 =$ | −708.168 | $_2d_1 =$ | 1.2500 | $_2\nu_1 =$ | 55.6 | $_2n_1 =$ | 1.69680 | $_2L_1$ | |
| $_2r_2 =$ | 22.809 | $_2d_2 =$ | 5.0000 | | | | | | |
| $_2r_3 =$ | −175.109 | $_2d_3 =$ | 1.1500 | $_2\nu_2 =$ | 47.5 | $_2n_2 =$ | 1.78797 | $_2L_2$ | $G_2$ |
| $_2r_4 =$ | 87.266 | $_2d_4 =$ | 0.5000 | | | | | | |
| $_2r_5 =$ | 35.758 | $_2d_5 =$ | 3.1000 | $_2\nu_3 =$ | 25.4 | $_2n_3 =$ | 1.80518 | $_2L_3$ | |
| $_2r_6 =$ | 165.776 | $D_2 =$ | Variable | | | | | | |
| $_3r_1 =$ | −51.423 | $_3d_1 =$ | 1.1500 | $_3\nu_1 =$ | 57.6 | $_3n_1 =$ | 1.67025 | $_3L_1$ | |
| $_3r_2 =$ | 81.327 | $_3d_2 =$ | 2.9500 | $_3\nu_2 =$ | 38.9 | $_3n_2 =$ | 1.67163 | $_3L_2$ | $G_3$ |
| $_3r_3 =$ | −169.527 | $D_3 =$ | Variable | | | | | | |
| $_4r_1 =$ | 174.041 | $_4d_1 =$ | 3.2500 | $_4\nu_1 =$ | 54.0 | $_4n_1 =$ | 1.71300 | $_4L_1$ | |
| $_4r_2 =$ | −63.180 | $_4d_2 =$ | 0.1000 | | | | | | |
| $_4r_3 =$ | 50.356 | $_4d_3 =$ | 5.0000 | $_4\nu_2 =$ | 60.8 | $_4n_2 =$ | 1.56384 | $_4L_2$ | |
| $_4r_4 =$ | −70.071 | $_4d_4 =$ | 1.1000 | $_4\nu_3 =$ | 41.0 | $_4n_3 =$ | 1.79631 | $_4L_3$ | |
| $_4r_5 =$ | 229.755 | $_4d_5 =$ | 0.1000 | | | | | | $G_{41}$ |
| $_4r_6 =$ | 25.187 | $_4d_6 =$ | 5.6000 | $_4\nu_4 =$ | 59.0 | $_4n_4 =$ | 1.51823 | $_4L_4$ | |
| $_4r_7 =$ | −745.542 | $_4d_7 =$ | 1.0000 | | | | | | |

-continued

| | | | | | | | | |
|---|---|---|---|---|---|---|---|---|
| $_4r_8 =$ | 262.417 | $_4d_8 =$ | 2.0000 | $_4\nu_5 =$ | 28.6 | $_4n_5 =$ | 1.79504 | $_4L_5$ |
| $_4r_9 =$ | 37.552 | $_4d_9 =$ | 10.1500 | | | | | |
| $_4r_{10} =$ | 111.689 | $_4d_{10} =$ | 3.0000 | $_4\nu_6 =$ | 64.1 | $_4n_6 =$ | 1.51680 | $_4L_6$ |
| $_4r_{11} =$ | −97.520 | $_4d_{11} =$ | 20.8500 | | | | | |
| $_4r_{12} =$ | −18.386 | $_4d_{12} =$ | 2.0000 | $_4\nu_7 =$ | 47.1 | $_4n_7 =$ | 1.67003 | $_4L_7$ |
| $_4r_{13} =$ | −31.592 | $_4d_{13} =$ | 0.1000 | | | | | |
| $_4r_{14} =$ | 941.473 | $_4d_{14} =$ | 4.5500 | $_4\nu_8 =$ | 41.0 | $_4n_8 =$ | 1.70154 | $_4L_8$ |
| $_4r_{15} =$ | −72.586 | | | | | | | |

$G_{42}$, $G_{43}$ grouped into $G_4$

| | f = 51.35 | f = 90.0 | f = 131.5 |
|---|---|---|---|
| $D_1$ | 2.956 | 24.277 | 35.427 |
| $D_2$ | 27.727 | 6.833 | 2.852 |
| $D_3$ | 9.846 | 9.418 | 2.251 |
| B·f | 39.997 | 39.997 | 39.997 |

$f_{42} = 101.234$
$f(_4r_9) = -47.233$
$f(_4r_{12}) = -45.827$
$f(_4L_4) = 47.131$
$f(_4L_5) = -41.198$

The various aberrations in the shortest, intermediate and longest focal length conditions of the first embodiment are shown in FIGS. 2A, 2B and 2C.

Figure 3:
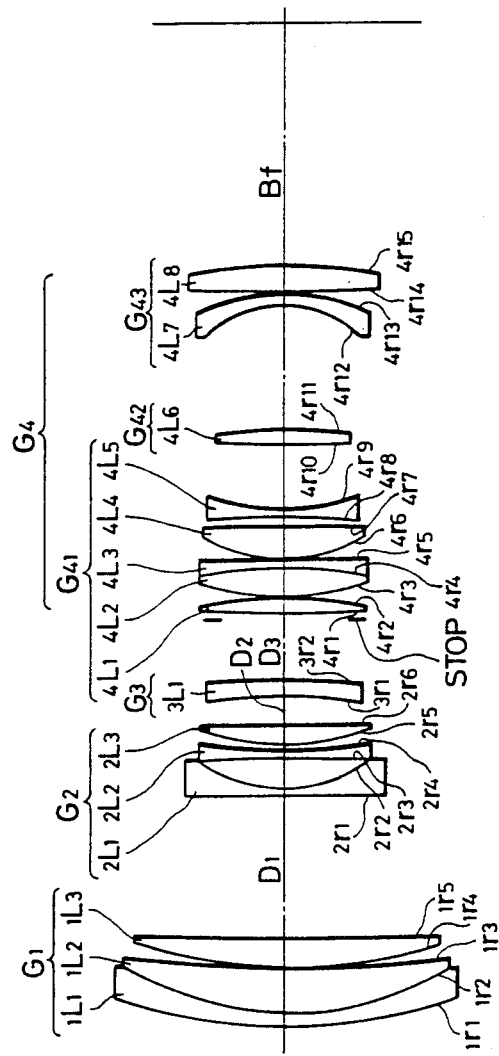
FIG. 3 shows the lens construction according to second and third embodiments of the present invention.
Figure 4A:
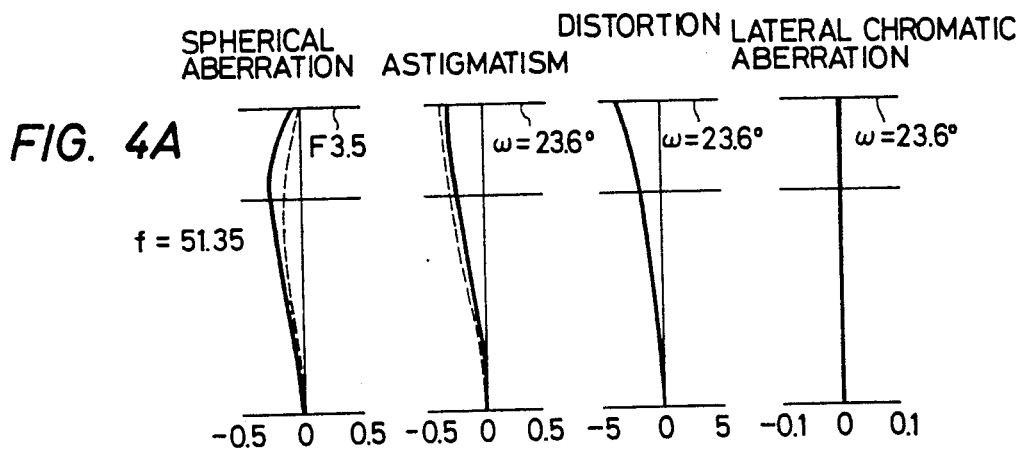
Figure 4B:
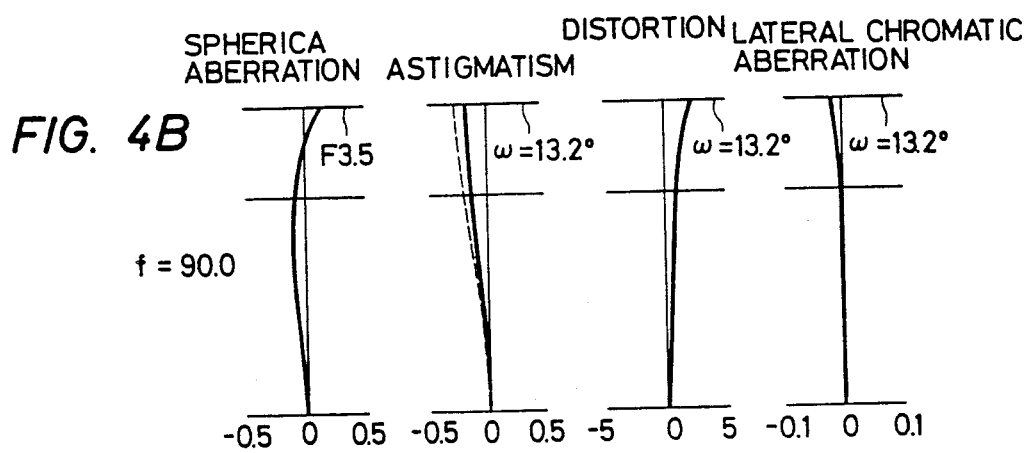
Figure 4C:
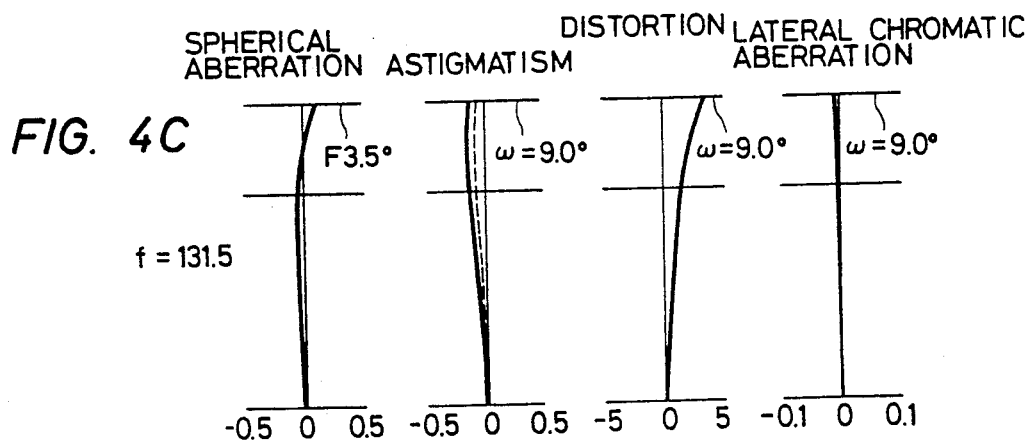
Figure 5A:
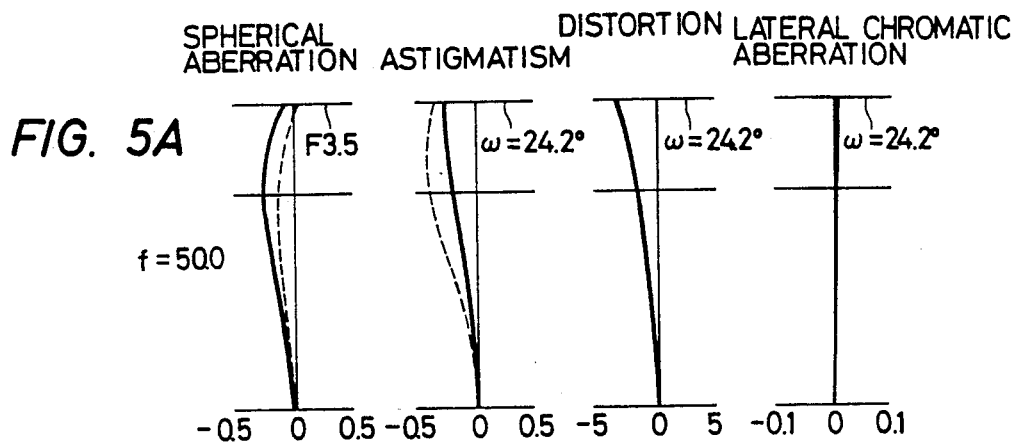
Figure 5B:
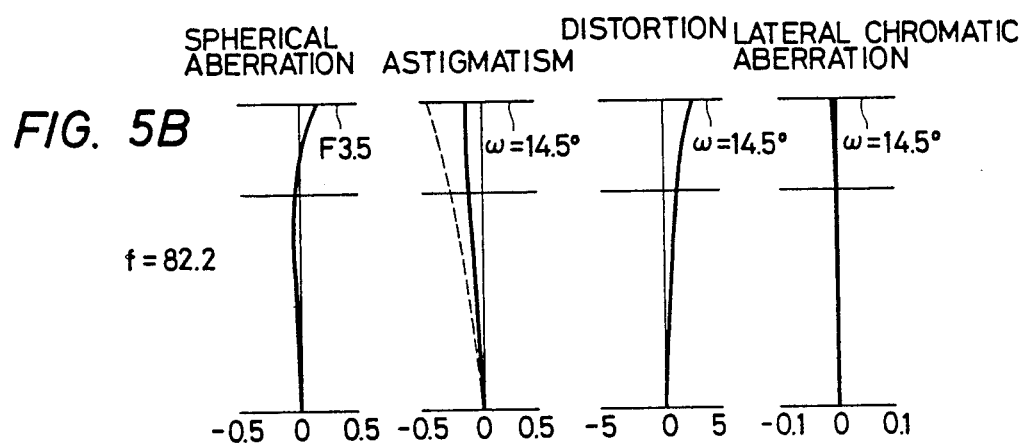
Figure 5C:
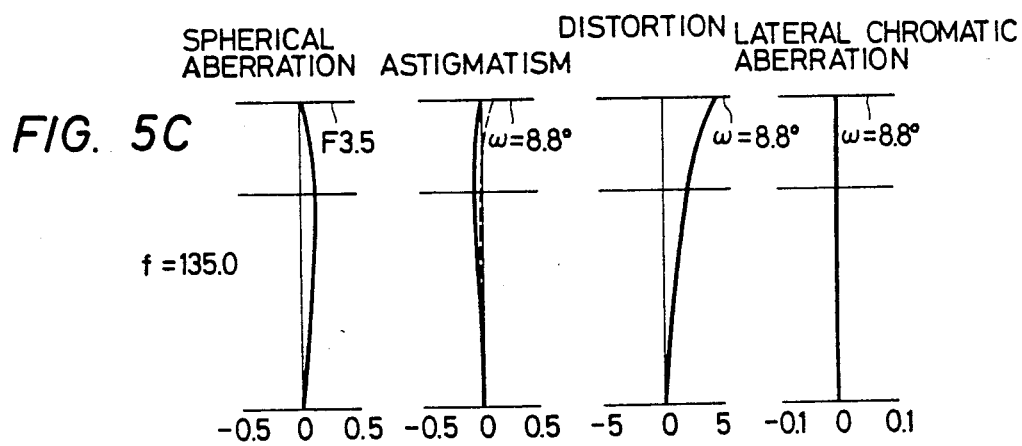

A second embodiment of the present invention, as shown in the lens construction of FIG. 3, has a construction and specification substantially similar to those of the first embodiment with the exception that the third unit $G_3$ comprises a single negative meniscus lens having its convex surface facing the image side. A third embodiment of the present invention has a construction and specification similar to those of the second embodiment.

The numerical data of the second and third embodiments will be shown below.

SECOND EMBODIMENT

Focal length f = 51.35∼131.5  F-number 3.5
Angle of view 2W = 47.2°∼18.04°

| | | | | | | | | |
|---|---|---|---|---|---|---|---|---|
| $_1r_1 =$ | 87.999 | $_1d_1 =$ | 1.7000 | $_1\nu_1 =$ | 25.4 | $_1n_1 =$ | 1.80518 | $_1L_1$ |
| $_1r_2 =$ | 47.531 | $_1d_2 =$ | 8.0000 | $_1\nu_2 =$ | 57.6 | $_1n_2 =$ | 1.67025 | $_1L_2$ |
| $_1r_3 =$ | 199.171 | $_1d_3 =$ | 0.1000 | | | | | |
| $_1r_4 =$ | 78.892 | $_1d_4 =$ | 5.0000 | $_1\nu_3 =$ | 47.1 | $_1n_3 =$ | 1.67003 | $_1L_3$ |
| $_1r_5 =$ | 691.489 | $D_1 =$ | Variable | | | | | |
| $_2r_1 =$ | −643.496 | $_2d_1 =$ | 1.2500 | $_2\nu_1 =$ | 55.6 | $_2n_1 =$ | 1.69680 | $_2L_1$ |
| $_2r_2 =$ | 22.672 | $_2d_2 =$ | 5.0000 | | | | | |
| $_2r_3 =$ | −131.331 | $_2d_3 =$ | 1.1500 | $_2\nu_2 =$ | 47.5 | $_2n_2 =$ | 1.78797 | $_2L_2$ |
| $_2r_4 =$ | 86.474 | $_2d_4 =$ | 0.5000 | | | | | |
| $_2r_5 =$ | 37.023 | $_2d_5 =$ | 3.1000 | $_2\nu_3 =$ | 25.4 | $_2n_3 =$ | 1.80518 | $_2L_3$ |
| $_2r_6 =$ | 332.436 | $D_2 =$ | Variable | | | | | |
| $_3r_1 =$ | −51.169 | $_3d_1 =$ | 2.5000 | $_3\nu_1 =$ | 57.6 | $_3n_1 =$ | 1.67025 | $_3L_1$ |
| $_3r_2 =$ | −163.876 | $D_3 =$ | Variable | | | | | |
| $_4r_1 =$ | 180.253 | $_4d_1 =$ | 3.2500 | $_4\nu_1 =$ | 48.1 | $_4n_1 =$ | 1.71700 | $_4L_1$ |
| $_4r_2 =$ | −63.733 | $_4d_2 =$ | 0.1000 | | | | | |
| $_4r_3 =$ | 53.406 | $_4d_3 =$ | 5.0000 | $_4\nu_2 =$ | 56.0 | $_4n_2 =$ | 1.56883 | $_4L_2$ |
| $_4r_4 =$ | −64.720 | $_4d_4 =$ | 1.1000 | $_4\nu_3 =$ | 41.0 | $_4n_3 =$ | 1.79631 | $_4L_3$ |
| $_4r_5 =$ | 284.700 | $_4d_5 =$ | 0.1000 | | | | | |
| $_4r_6 =$ | 25.066 | $_4d_6 =$ | 5.600 | $_4\nu_4 =$ | 59.0 | $_4n_4 =$ | 1.51823 | $_4L_4$ |
| $_4r_7 =$ | −722.522 | $_4d_7 =$ | 1.0000 | | | | | |
| $_4r_8 =$ | −239.922 | $_4d_8 =$ | 2.0000 | $_4\nu_5 =$ | 28.6 | $_4n_5 =$ | 1.79504 | $_4L_5$ |
| $_4r_9 =$ | 37.958 | $_4d_9 =$ | 10.1500 | | | | | |
| $_4r_{10} =$ | 114.966 | $_4d_{10} =$ | 3.0000 | $_4\nu_6 =$ | 64.1 | $_4n_6 =$ | 1.51680 | $_4L_6$ |
| $_4r_{11} =$ | −86.011 | $_4d_{11} =$ | 20.8500 | | | | | |
| $_4r_{12} =$ | −18.380 | $_4d_{12} =$ | 2.0000 | $_4\nu_7 =$ | 47.1 | $_4n_7 =$ | 1.67003 | $_4L_7$ |
| $_4r_{13} =$ | −31.099 | $_4d_{13} =$ | 0.1000 | | | | | |
| $_4r_{14} =$ | 1603.065 | $_4d_{14} =$ | 4.5500 | $_4\nu_8 =$ | 42.0 | $_4n_8 =$ | 1.66755 | $_4L_8$ |
| $_4r_{15} =$ | −73.119 | | | | | | | |

| | f = 51.35 | f = 90.0 | f = 131.5 |
|---|---|---|---|
| $D_1$ | 2.885 | 24.207 | 35.356 |
| $D_2$ | 26.980 | 6.086 | 2.104 |
| $D_3$ | 11.231 | 10.803 | 3.636 |
| B·f | 40.0 | 40.0 | 40.0 |

$f_{42} = 95.691$
$f(_4r_9) = -47.744$
$f(_4r_{12}) = -45.812$
$f(_4L_4) = 46.867$
$f(_4L_5) = -41.091$

THIRD EMBODIMENT

Focal length f = 50.0∼135.0  F-number 3.5
Angle of view 2W = 48.36°∼17.50°

| | | | | | | | | |
|---|---|---|---|---|---|---|---|---|
| $_1r_1 =$ | 117.081 | $_1d_1 =$ | 1.7500 | $_1\nu_1 =$ | 25.4 | $_1n_1 =$ | 1.80518 | $_1L_1$ |
| $_1r_2 =$ | 54.849 | $_1d_2 =$ | 8.0000 | $_1\nu_2 =$ | 55.6 | $_1n_2 =$ | 1.67790 | $_1L_2$ |
| $_1r_3 =$ | 282.548 | $_1d_3 =$ | 0.1000 | | | | | |
| $_1r_4 =$ | 72.149 | $_1d_4 =$ | 5.2000 | $_1\nu_3 =$ | 48.4 | $_1n_3 =$ | 1.66672 | $_1L_3$ |
| $_1r_5 =$ | 501.276 | $D_1 =$ | Variable | | | | | |
| $_2r_1 =$ | −651.355 | $_2d_1 =$ | 1.3000 | $_2\nu_1 =$ | 55.6 | $_2n_1 =$ | 1.69680 | $_2L_1$ |
| $_2r_2 =$ | 22.627 | $_2d_2 =$ | 4.5500 | | | | | |
| $_2r_3 =$ | −236.588 | $_2d_3 =$ | 1.2000 | $_2\nu_2 =$ | 57.3 | $_2n_2 =$ | 1.65830 | $_2L_2$ |
| $_2r_4 =$ | 73.295 | $_2d_4 =$ | 0.5000 | | | | | |

-continued

| | | | | | | | | | |
|---|---|---|---|---|---|---|---|---|---|
| $_2r_5 =$ | 33.063 | $_2d_5 =$ | 3.2000 | $_2\nu_3 =$ | 25.4 | $_2n_3 =$ | 1.80518 | $_2L_3$ | |
| $_2r_6 =$ | 107.604 | $D_2 =$ | Variable | | | | | | |
| $_3r_1 =$ | −49.390 | $_3d_1 =$ | 1.2000 | $_3\nu_1 =$ | 57.6 | $_3n_1 =$ | 1.67025 | $_3L_1$ | $G_3$ |
| $_3r_2 =$ | −143.455 | $D_3 =$ | Variable | | | | | | |
| $_4r_1 =$ | 302.318 | $_4d_1 =$ | 3.2000 | $_4\nu_1 =$ | 48.1 | $_4n_1 =$ | 1.71700 | $_4L_1$ | |
| $_4r_2 =$ | −56.420 | $_4d_2 =$ | 0.1000 | | | | | | |
| $_4r_3 =$ | 42.090 | $_4d_3 =$ | 5.000 | $_4\nu_2 =$ | 57.7 | $_4n_2 =$ | 1.57250 | $_4L_2$ | |
| $_4r_4 =$ | −91.578 | $_4d_4 =$ | 1.0000 | $_4\nu_3 =$ | 41.0 | $_4n_3 =$ | 1.79631 | $_4L_3$ | $G_{41}$ |
| $_4r_5 =$ | 282.945 | $_4d_5 =$ | 0.1000 | | | | | | |
| $_4r_6 =$ | 25.063 | $_4d_6 =$ | 5.50 | $_4\nu_4 =$ | 59.0 | $_4n_4 =$ | 1.51823 | $_4L_4$ | |
| $_4r_7 =$ | −457.824 | $_4d_7 =$ | 1.0000 | | | | | | |
| $_4r_8 =$ | −361.839 | $_4d_8 =$ | 2.0000 | $_4\nu_5 =$ | 28.6 | $_4n_5 =$ | 1.79504 | $_4L_5$ | $G_4$ |
| $_4r_9 =$ | 30.961 | $_4d_9 =$ | 10.0000 | | | | | | |
| $_4r_{10} =$ | 165.161 | $_4d_{10} =$ | 3.0000 | $_4\nu_6 =$ | 64.1 | $_4n_6 =$ | 1.51680 | $_4L_6$ | $G_{42}$ |
| $_4r_{11} =$ | −133.734 | $_4d_{11} =$ | 19.7643 | | | | | | |
| $_4r_{12} =$ | −17.944 | $_4d_{12} =$ | 2.0000 | $_4\nu_7 =$ | 47.1 | $_4n_7 =$ | 1.67003 | $_4L_7$ | $G_{43}$ |
| $_4r_{13} =$ | −26.804 | $_4d_{13} =$ | 0.1000 | | | | | | |
| $_4r_{14} =$ | −180.359 | $_4d_{14} =$ | 4.5000 | $_4\nu_8 =$ | 42.0 | $_4n_8 =$ | 1.66755 | $_4L_8$ | |
| $_4r_{15} =$ | −49.376 | | | | | | | | |

| | | | | |
|---|---|---|---|---|
| | f = 50.0 | f = 82.16 | f = 135.0 | $f_{42} = 143.482$ |
| $D_1$ | 1.673 | 22.023 | 37.672 | $f(_4r_9) = -38.943$ |
| $D_2$ | 32.651 | 11.223 | 3.292 | $f(_4r_{12}) = -44.725$ |
| $D_3$ | 9.207 | 10.284 | 2.567 | $f(_4L_4) = 46.032$ |
| B · f | 40.0 | 40.0 | 40.0 | $f(_4L_5) = -35.792$ |

The various aberrations in the shortest, intermediate and longest focal length conditions of the second and third embodiments are shown in FIGS. 4A, 4B and 4C and 5A, 5B and 5C, respectively.

From the aberration graphs of these embodiments, it is apparent that the zoom lens according to the present invention is compact and yet has an excellent imaging performance as a zoom lens for 35 mm still camera.

I claim:

1. A zoom lens comprising, in succession from the object side, a convergent first lens unit ($G_1$) stationary during zooming and moved on the optical axis during focusing, a divergent second lens unit ($G_2$) which is a variator moved on the optical axis during zooming, a divergent third lens unit ($G_3$) which is a compensator moved on the optical axis during zooming, and a convergent fourth lens unit ($G_4$) as a master lens system stationary during zooming, characterized in that said fourth lens unit ($G_4$) comprises, in succession from the object side, a convergent first master lens unit ($G_{41}$), a convergent second master lens unit ($G_{42}$) spaced from said first master lens unit ($G_{41}$) with an air space therebetween, and a divergent third master lens unit ($G_{43}$) spaced from said second master lens unit ($G_{42}$) with an air space therebetween, said first master lens unit ($G_{41}$) having, in succession from the object side, a positive lens, a positive and a negative lens cemented to each other in a cemented concave toward the object side, a positive lens having its surface of greater curvature facing the object side, and a negative lens having its surface of greater curvature facing the image side, said second master lens unit ($G_{42}$) having the biconvex lens, said third master lens unit ($G_{43}$) having a negative lens and a positive lens, said zoom lens satisfying the following conditions:

$$1.70 < |f_{42}/f(_4r_9)| < 4.20 \tag{1}$$

$$0.05 f_{42} < _4d_9 < 0.13 f_{42} \tag{2}$$

$$-0.2 < (_4r_{11} + _4r_{10})/(_4r_{11} - _4r_{10}) < 0.1 \tag{3}$$

$$0.75 < f(_4r_9)/f(_4r_{12}) < 1.15 \tag{4}$$

$$0.65 f(_4r_{12}) < _4d_9 + n(_4L_6) \cdot _4d_{10} + _4d_{11} < 0.85 f(_4r_{12}) \tag{5}$$

$$n(_4L_3) - n(_4L_2) \geq 0.18 \tag{6}$$

$$0.8 < |f(_4L_4)/f(_4L_5)| < 1.35 \tag{7}$$

$$n(_4L_5) - n(_4L_4) \geq 0.23 \tag{8}$$

where $_ir_j$: radius of curvature of the jth surface from the object side in the ith lens unit $_id_j$: spacing of the jth lens surface from the object side in the ith lens unit $n(_iL_j)$: refractive index for d-line of the jth lens from the object side in the ith lens unit $f_{42}$: focal length of the second master lens unit $G_{42}$ $f(_ir_j)$: focal length of the jth surface from the object side in the ith lens unit $f(_iL_j)$: focal length of the jth lens from the object side in the ith lens unit.

2. A zoom lens according to claim 1, further satisfying the following conditions:

$$0.80 < (_4r_7 + _4r_6)/(_4r_7 - _4r_6) < 1.10 \tag{9}$$

$$-0.90 < (_4r_9 + _4r_8)/(_4r_7 - _4r_6) < 1.10 \tag{10}$$

$$2.5 < (_4r_{13} + _4r_{12})/(_4r_{13} - _4r_{12}) < 5.5 \tag{11}$$

$$n(_4L_1) \geq 1.65, \nu(_4L_1) \geq 44 \tag{12}$$

$$70 \geq (\nu(_4L_2) - \nu(_4L_3)) + (\nu(_4L_4) - \nu(_4L_5)) \geq 40 \tag{13}$$

$$|\nu(_4L_8) - \nu(_4L_7)| \leq 10 \tag{14}$$

where $\nu(_iL_j)$ represents the Abbe number of the jth lens from the object side in the ith lens unit.

3. A zoom lens according to claim 2, further satisfying the following conditions:

$$1.10 < f(_1L_3)/f_1 < 1.45 \tag{15}$$

$$1.65 \leq n(_1L_3) \leq 1.78 \tag{16}$$

$$45 \leq \nu(_1L_3) \leq 65 \tag{17}$$

$-1.0 < (_2r_2 + _2r_1)/(_2r_2 - _2r_1) < -0.85$ (18)

$1.0 < (_2r_6 + _2r_5)/(_2r_6 - _2r_5) < 2.0$ (19)

$n(_2L_1) \geq 1.65$ (20)

$n(_2L_3) \geq 1.70$ (21)

$1.75 < (_3r_b + _3r_a)/(_3r_b - _3r_a) < 2.3$ (22)

where $f_1$ represents the focal length of the entire first unit ($G_1$).

4. A zoom lens according to claim 3, wherein numerical data are as follows:

Focal length f = 51.35 − 131.5
F-number 3.5
Angle of view 2 W = 47.26° − 18.06°

| | | | | | | | | | |
|---|---|---|---|---|---|---|---|---|---|
| $_1r_1 =$ | 95.858 | $_1d_1 =$ | 1.7000 | $_1\nu_1 =$ | 25.4 | $_1n_1 =$ | 1.80518 | $_1L_1$ | |
| $_1r_2 =$ | 49.020 | $_1d_2 =$ | 8.0000 | $_1\nu_2 =$ | 55.6 | $_1n_2 =$ | 1.67790 | $_1L_2$ | $G_1$ |
| $_1r_3 =$ | 214.552 | $_1d_3 =$ | 0.1000 | | | | | | |
| $_1r_4 =$ | 75.769 | $_1d_4 =$ | 5.0000 | $_1\nu_3 =$ | 48.4 | $_1n_3 =$ | 1.66672 | $_1L_3$ | |
| $_1r_5 =$ | 691.304 | $D_1 =$ | (variable) | | | | | | |
| $_2r_1 =$ | −708.168 | $_2d_1 =$ | 1.2500 | $_2\nu_1 =$ | 55.6 | $_2n_1 =$ | 1.69680 | $_2L_1$ | |
| $_2r_2 =$ | 22.809 | $_2d_2 =$ | 5.0000 | | | | | | |
| $_2r_3 =$ | −175.109 | $_2d_3 =$ | 1.1500 | $_2\nu_2 =$ | 47.5 | $_2n_2 =$ | 1.78797 | $_2L_2$ | $G_2$ |
| $_2r_4 =$ | 87.266 | $_2d_4 =$ | 0.5000 | | | | | | |
| $_2r_5 =$ | 35.758 | $_2d_5 =$ | 3.1000 | $_2\nu_3 =$ | 25.4 | $_2n_3 =$ | 1.80518 | $_2L_3$ | |
| $_2r_6 =$ | 165.776 | $D_2 =$ | (variable) | | | | | | |
| $_3r_1 =$ | −51.423 | $_3d_1 =$ | 1.1500 | $_3\nu_1 =$ | 57.6 | $_3n_1 =$ | 1.67025 | $_3L_1$ | $G_3$ |
| $_3r_2 =$ | 81.327 | $_3d_2 =$ | 2.9500 | $_3\nu_2 =$ | 38.9 | $_3n_2 =$ | 1.67163 | $_3L_2$ | |
| $_3r_3 =$ | −169.527 | $D_3 =$ | (variable) | | | | | | |
| $_4r_1 =$ | 174.041 | $_4d_1 =$ | 3.2500 | $_4\nu_1 =$ | 54.0 | $_4n_1 =$ | 1.71300 | $_4L_1$ | |
| $_4r_2 =$ | −63.180 | $_4d_2 =$ | 0.1000 | | | | | | |
| $_4r_3 =$ | 50.356 | $_4d_3 =$ | 5.0000 | $_4\nu_2 =$ | 60.8 | $_4n_2 =$ | 1.56384 | $_4L_2$ | |
| $_4r_4 =$ | −70.071 | $_4d_4 =$ | 1.1000 | $_4\nu_3 =$ | 41.0 | $_4n_3 =$ | 1.79631 | $_4L_3$ | $G_{41}$ |
| $_4r_5 =$ | 229.755 | $_4d_5 =$ | 0.1000 | | | | | | |
| $_4r_6 =$ | 25.187 | $_4d_6 =$ | 5.6000 | $_4\nu_4 =$ | 59.0 | $_4n_4 =$ | 1.51823 | $_4L_4$ | |
| $_4r_7 =$ | −745.542 | $_4d_7 =$ | 1.0000 | | | | | | $G_4$ |
| $_4r_8 =$ | −262.417 | $_4d_8 =$ | 2.0000 | $_4\nu_5 =$ | 28.6 | $_4n_5 =$ | 1.79504 | $_4L_5$ | |
| $_4r_9 =$ | 37.552 | $_4d_9 =$ | 10.1500 | | | | | | |
| $_4r_{10} =$ | 111.689 | $_4d_{10} =$ | 3.0000 | $_4\nu_6 =$ | 64.1 | $_4n_6 =$ | 1.51680 | $_4L_6$ | $G_{42}$ |
| $_4r_{11} =$ | −97.520 | $_4d_{11} =$ | 20.8500 | | | | | | |
| $_4r_{12} =$ | −18.386 | $_4d_{12} =$ | 2.0000 | $_4\nu_7 =$ | 47.1 | $_4n_7 =$ | 1.67003 | $_4L_7$ | $G_{43}$ |
| $_4r_{13} =$ | −31.592 | $_4d_{13} =$ | 0.1000 | | | | | | |
| $_4r_{14} =$ | 941.473 | $_4d_{14} =$ | 4.5500 | $_4\nu_8 =$ | 41.0 | $_4n_8 =$ | 1.70154 | $_4L_8$ | |
| $_4r_{15} =$ | −72.586 | | | | | | | | |

| | f = 51.35 | f = 90.0 | f = 131.5 | | $f_{42} =$ 101.234 |
|---|---|---|---|---|---|
| $D_1$ | 2.956 | 24.277 | 35.427 | | $f(r_9) =$ −47.233 |
| $D_2$ | 27.727 | 6.833 | 2.852 | | $f(_4r_{12}) =$ −45.827 |
| $D_3$ | 9.846 | 9.418 | 2.251 | | $f(_4L_4) =$ 47.131 |
| B · f | 39.997 | 39.997 | 39.997 | | $f(_4L_5) =$ −41.198 | where $_in_j$ and $_i\nu_j$ represent the refractive index of the Abbe number, respectively, of the jth lens from the object side in the ith lens unit, $D_i$ represents the air space between the ith lens unit and the subsequent lens unit, and Bf represents the back focal length.

5. A zoom lens according to claim 3, wherein numerical data are as follows:

Focal length f = 51.35−131.5
F-number 3.5
Angle of view 2 W = 47.2° − 18.04°

| | | | | | | | | | |
|---|---|---|---|---|---|---|---|---|---|
| $_1r_1 =$ | 87.999 | $_1d_1 =$ | 1.7000 | $_1\nu_1 =$ | 25.4 | $_1n_1 =$ | 1.80518 | $_1L_1$ | |
| $_1r_2 =$ | 47.531 | $_1d_2 =$ | 8.000 | $_1\nu_2 =$ | 57.6 | $_1n_2 =$ | 1.67025 | $_1L_2$ | $G_1$ |
| $_1r_3 =$ | 199.171 | $_1d_3 =$ | 0.1000 | | | | | | |
| $_1r_4 =$ | 78.892 | $_1d_4 =$ | 5.0000 | $_1\nu_3 =$ | 47.1 | $_1n_3 =$ | 1.67003 | $_1L_3$ | |
| $_1r_5 =$ | 691.489 | $D_1 =$ | (variable) | | | | | | |
| $_2r_1 =$ | −643.496 | $_2d_1 =$ | 1.2500 | $_2\nu_1 =$ | 55.6 | $_2n_1 =$ | 1.69680 | $_2L_1$ | |
| $_2r_2 =$ | 22.672 | $_2d_2 =$ | 5.0000 | | | | | | |
| $_2r_3 =$ | −131.331 | $_2d_3 =$ | 1.1500 | $_2\nu_2 =$ | 47.5 | $_2n_2 =$ | 1.78797 | $_2L_2$ | $G_2$ |
| $_2r_4 =$ | 86.474 | $_2d_4 =$ | 0.5000 | | | | | | |
| $_2r_5 =$ | 37.023 | $_2d_5 =$ | 3.1000 | $_2\nu_3 =$ | 25.4 | $_2n_3 =$ | 1.80518 | $_2L_3$ | |
| $_2r_6 =$ | 332.436 | $D_2 =$ | (variable) | | | | | | |
| $_3r_1 =$ | −51.169 | $_3d_1 =$ | 2.5000 | $_3\nu_1 =$ | 57.6 | $_3n_1 =$ | 1.67025 | $_3L_1$ | $G_3$ |
| $_3r_2 =$ | −163.876 | $D_3 =$ | (variable) | | | | | | |
| $_4r_1 =$ | 180.243 | $_4d_1 =$ | 3.2500 | $_4\nu_1 =$ | 48.1 | $_4n_1 =$ | 1.71700 | $_4L_1$ | |
| $_4r_2 =$ | −63.733 | $_4d_2 =$ | 0.1000 | | | | | | |
| $_4r_3 =$ | 53.406 | $_4d_3 =$ | 5.0000 | $_4\nu_2 =$ | 56.0 | $_4n_2 =$ | 1.56883 | $_4L_2$ | |
| $_4r_4 =$ | −64.720 | $_4d_4 =$ | 1.1000 | $_4\nu_3 =$ | 41.0 | $_4n_3 =$ | 1.79631 | $_4L_3$ | $G_{41}$ |
| $_4r_5 =$ | 284.700 | $_4d_5 =$ | 0.1000 | | | | | | |
| $_4r_6 =$ | 25.066 | $_4d_6 =$ | 5.6000 | $_4\nu_4 =$ | 59.0 | $_4n_4 =$ | 1.51823 | $_4L_4$ | |

-continued

| | | | | | | | |
|---|---|---|---|---|---|---|---|
| $_4r_7 =$ −722.522 | $_4d_7 =$ 1.0000 | | | | | | G$_4$ |
| $_4r_8 =$ −239.922 | $_4d_8 =$ 2.0000 | $_4\nu_5 =$ 28.6 | $_4n_5 =$ 1.79504 | $_4L_5$ | | |
| $_4r_9 =$ 37.958 | $_4d_9 =$ 10.1500 | | | | | |
| $_4r_{10} =$ 114.966 | $_4d_{10} =$ 3.0000 | $_4\nu_6 =$ 64.1 | $_4n_6 =$ 1.51680 | $_4L_6$ | G$_{42}$ | |
| $_4r_{11} =$ −86.011 | $_4d_{11} =$ 20.8500 | | | | | |
| $_4r_{12} =$ −18.380 | $_4d_{12} =$ 2.0000 | $_4\nu_7 =$ 47.1 | $_4n_7 =$ 1.67003 | $_4L_7$ | G$_{43}$ | |
| $_4r_{13} =$ −31.099 | $_4d_{13} =$ 0.1000 | | | | | |
| $_4r_{14} =$ 1603.065 | $_4d_{14} =$ 4.5500 | $_4\nu_8 =$ 42.0 | $_4n_8 =$ 1.66755 | $_4L_8$ | | |
| $_4r_{15} =$ −73.119 | | | | | | |

| | f = 51.35 | f = 90.0 | f = 131.5 | |
|---|---|---|---|---|
| D$_1$ | 2.885 | 24.207 | 35.356 | f$_{42}$ = 95.691 |
| D$_2$ | 26.980 | 6.086 | 2.104 | f($_4$r$_9$) = −47.744 |
| D$_3$ | 11.231 | 10.803 | 3.636 | f($_4$r$_{12}$) = −45.812 |
| B · f | 40.0 | 40.0 | 40.0 | f*$_4$L$_4$) = 46.867 |
| | | | | f($_4$L$_5$) = −41.091 | where $_in_j$ and $_i\nu_j$ represent the refractive index and the Abbe number, respectively, of the jth lens from the object side in the ith lens unit, $D_i$ represents the air space between the ith lens unit and the subsequent lens unit, and Bf represents the back focal length.

6. A zoom lens according to claim 3, wherein numerical data are as follows:

Focal length f = 50.0–135.0
F-number 3.5
Angle of view 2 W = 48.36° − 17.50°

| | | | | | | |
|---|---|---|---|---|---|---|
| $_1r_1 =$ 117.081 | $_1d_1 =$ 1.7500 | $_1\nu_1 =$ 25.4 | $_1n_1 =$ 1.80518 | $_1L_1$ | | |
| $_1r_2 =$ 54.849 | $_1d_2 =$ 8.0000 | $_1\nu_2 =$ 55.6 | $_1n_2 =$ 1.67790 | $_1L_2$ | | G$_1$ |
| $_1r_3 =$ 282.548 | $_1d_3 =$ 0.1000 | | | | | |
| $_1r_4 =$ 72.149 | $_1d_4 =$ 5.2000 | $_1\nu_3 =$ 48.4 | $_1n_3 =$ 1.66672 | $_1L_3$ | | |
| $_1r_5 =$ 501.276 | $D_1 =$ (variable) | | | | | |
| $_2r_1 =$ −651.355 | $_2d_1 =$ 1.3000 | $_2\nu_1 =$ 55.6 | $_2n_1 =$ 1.69680 | $_2L_1$ | | |
| $_2r_2 =$ 22.627 | $_2d_2 =$ 4.5500 | | | | | |
| $_2r_3 =$ −236.588 | $_2d_3 =$ 1.2000 | $_2\nu_2 =$ 57.3 | $_2n_2 =$ 1.65830 | $_2L_2$ | | G$_2$ |
| $_2r_4 =$ 73.295 | $_2d_4 =$ 0.5000 | | | | | |
| $_2r_5 =$ 33.063 | $_2d_5 =$ 3.2000 | $_2\nu_3 =$ 25.4 | $_2n_3 =$ 1.80518 | $_2L_3$ | | |
| $_2r_6 =$ 107.604 | $D_2 =$ (variable) | | | | | |
| $_3r_1 =$ −49.390 | $_3d_1 =$ 1.2000 | $_3\nu_1 =$ 57.6 | $_3n_1 =$ 1.67025 | $_3L_1$ | | G$_3$ |
| $_3r_2 =$ −143.455 | $D_3 =$ (variable) | | | | | |
| $_4r_1 =$ 302.318 | $_4d_1 =$ 3.2000 | $_4\nu_1 =$ 48.1 | $_4n_1 =$ 1.71700 | $_4L_1$ | | |
| $_4r_2 =$ −56.420 | $_4d_2 =$ 0.1000 | | | | | |
| $_4r_3 =$ 42.090 | $_4d_3 =$ 5.0000 | $_4\nu_2 =$ 57.7 | $_4n_2 =$ 1.57250 | $_4L_2$ | | |
| $_4r_4 =$ −91.578 | $_4d_4 =$ 1.0000 | $_4\nu_3 =$ 41.0 | $_4n_3 =$ 1.79631 | $_4L_3$ | G$_{41}$ | |
| $_4r_5 =$ 282.945 | $_4d_5 =$ 0.1000 | | | | | |
| $_4r_6 =$ 25.063 | $_4d_6 =$ 5.5000 | $_4\nu_4 =$ 59.0 | $_4n_4 =$ 1.51823 | $_4L_4$ | | |
| $_4r_7 =$ −457.824 | $_4d_7 =$ 1.0000 | | | | | G$_4$ |
| $_4r_8 =$ −361.839 | $_4d_8 =$ 2.0000 | $_4\nu_5 =$ 28.6 | $_4n_5 =$ 1.79504 | $_4L_5$ | | |
| $_4r_9 =$ 30.961 | $_4d_9 =$ 10.0000 | | | | | |
| $_4r_{10} =$ 165.161 | $_4d_{10} =$ 3.0000 | $_4\nu_6 =$ 64.1 | $_4n_6 =$ 1.51680 | $_4L_6$ | G$_{42}$ | |
| $_4r_{11} =$ −133.734 | $_4d_{11} =$ 19.7643 | | | | | |
| $_4r_{12} =$ −17.944 | $_4d_{12} =$ 2.0000 | $_4\nu_7 =$ 47.1 | $_4n_7 =$ 1.67003 | $_4L_7$ | G$_{43}$ | |
| $_4r_{13} =$ −26.804 | $_4d_{13} =$ 0.1000 | | | | | |
| $_4r_{14} =$ −108.359 | $_4d_{14} =$ 4.5000 | $_4\nu_8 =$ 42.0 | $_4n_8 =$ 1.66755 | $_4L_8$ | | |
| $_4r_{15} =$ −49.376 | | | | | | |

| | f = 50.0 | f = 82.16 | f = 135.0 | |
|---|---|---|---|---|
| D$_1$ | 1.673 | 22.023 | 37.672 | f$_{42}$ = 143.482 |
| D$_2$ | 32.651 | 11.223 | 3.292 | f($_4$r$_9$) = −38.493 |
| D$_3$ | 9.207 | 10.284 | 2.567 | f($_4$r$_{12}$) = −44.725 |
| B · f | 40.0 | 40.0 | 40.0 | f($_4$L$_4$) = 46.032 |
| | | | | f($_4$L$_5$) = −35.792 | where $_in_j$ and $_i\nu_j$ represent the refractive index and the Abbe number, respectively, of the jth lens from the object side in the ith lens unit, $D_i$ represents the air space between the ith lens unit and the subsequent lens unit, and Bf represents the back focal length.

* * * * *